(12) United States Patent
Moore

(10) Patent No.: US 8,230,984 B2
(45) Date of Patent: Jul. 31, 2012

(54) HOLDER FOR HYDRAULIC BRAKE ASSEMBLY

(75) Inventor: Wayne-Ian Moore, Changhua County (TW)

(73) Assignee: Ashima Ltd., Changhua County (TW)

( * ) Notice: Subject to any disclaimer, the term of this patent is extended or adjusted under 35 U.S.C. 154(b) by 278 days.

(21) Appl. No.: 12/754,585

(22) Filed: Apr. 5, 2010

(65) Prior Publication Data
US 2011/0240419 A1 Oct. 6, 2011

(51) Int. Cl.
*F16D 55/00* (2006.01)
(52) U.S. Cl. .................. 188/73.31; 188/73.35; 188/71.1
(58) Field of Classification Search .............. 188/73.31, 188/73.42, 73.35, 73.36, 73.37, 71.1, 71.7, 188/72.1, 72.4, 73.1
See application file for complete search history.

(56) References Cited

U.S. PATENT DOCUMENTS

| | | | | |
|---|---|---|---|---|
| 3,995,723 | A | * | 12/1976 | Holcomb, Jr. ............... 188/72.4 |
| 4,042,072 | A | * | 8/1977 | Baba ............................ 188/71.8 |
| 5,259,483 | A | * | 11/1993 | Pelfrey ......................... 188/71.1 |
| 6,068,090 | A | * | 5/2000 | Chen et al. ................. 188/24.22 |

* cited by examiner

*Primary Examiner* — Pamela Rodriguez

(57) ABSTRACT

A holder for hydraulic brake assembly includes a holder. The holder has one end thrust by a pushing mechanism and another end connected to a brake shoe. The holder has a skirt formed on one end thereof and outwardly extending therefrom to define a receiving space in between the skirt. The pushing mechanism is selectively received in the receiving space in the skirt. The skirt is provided for stably connecting to the pushing mechanism such that the pushing mechanism is steady thrust with the holder to provide a stable brake effect and prevent wear from an unstable contact.

8 Claims, 7 Drawing Sheets

US 8,230,984 B2

HOLDER FOR HYDRAULIC BRAKE ASSEMBLY

BACKGROUND OF THE INVENTION

1. Field of the Invention

The present invention relates to a holder, and more particularly to a holder for a hydraulic brake assembly used for a vehicle such as a bicycle, a motorcycle, and the like.

2. Description of Related Art

A conventional hydraulic caliper device in accordance with the prior art comprises a casing having an opened room defined therein. An elastomer is sealingly received in the room for receiving brake oil. The elastomer has a side portion abutting against an inner wall of the room. The elastomer has a protrusion connected with a brake shoe. The elastomer has a U-shaped portion formed between the protrusion and the side portion for providing a movement of the U-shaped portion. A fixing board is configured between the casing and the elastomer. The fixing board has a shoulder formed thereon and corresponding to a flange of the elastomer for fixing the elastomer. Wherein when an oil pressure is higher than an elastic restoring force of the elastomer, the protrusion is pushed by the oil pressure and the brake shoe is provided for braking operation.

However, the conventional hydraulic caliper device is provided for a disk brake. Most bicycles are designed for rim brake. The conventional hydraulic caliper device is not suitable to a caliper of the rim brake.

A conventional brake shoe in accordance with the prior art comprises a plastic injection molded base block. The base block has a fixing portion formed on one side thereof and a connecting portion formed on another side thereof. A rubber brake block has one side integrally covered on the connecting portion, such that the base block and the brake block are integrally formed. The brake block has a brake shoe formed on another side thereof for providing braking effort.

However, the conventional brake shoe is utilized for the caliper of the rim brake. The conventional brake shoe is mounted on the caliper and abutted against the rim. The conventional brake shoe is not horizontally abutted against the rim due to the pivotal rotation of the caliper. Therefore, the conventional brake shoe is angularly abraded and cannot be effectively utilized. Furthermore, it is dangerous that the conventional brake shoe is angularly abutted against the rim during rainy days.

The present invention has arisen to mitigate and/or obviate the disadvantages of the conventional brake hydraulic caliper device and brake shoe.

SUMMARY OF THE INVENTION

The main objective of the present invention is to provide an improved holder for a hydraulic brake assembly utilized for a vehicle such as a bicycle, a motorcycle, and the like.

To achieve the objective, the holder for a hydraulic brake assembly comprises a holder having one end connected to a pushing mechanism and another end connected to a brake shoe. The pushing mechanism is mounted on a housing. The holder, the pushing mechanism, and the brake shoe are combined to form a hydraulic brake assembly. The housing has a chamber defined therein. The pushing mechanism has an elastomer received in the chamber. The pushing mechanism further includes a sealing plate received in the chamber. The elastomer has a movable portion disposed in a center thereof and connected to the U-shaped portion. The holder has a skirt outwardly extending therefrom. The holder has two aprons extended therefrom. The two aprons are respectively positioned on two sides of the skirt. The movable portion of elastomer is received in the receiving space defined in the skirt. The skirt of the holder abuts against the U-shaped portion of the elastomer. The holder has a dove-tail groove defined therein for separately receiving the brake shoe.

When braking, the oil pressure in the chamber is raised. The U-shaped portion deforms gradually and the movable portion is pushed outwardly such that the holder and the brake shoe are pushed toward a rim until the brake shoe forces against the rim to brake. When the oil pressure is diminished, the movable portion is pulled back by the resilient force of the U-shaped portion. The skirt butts against the U-shaped portion and the movable portion stably abuts against a bottom of the receiving space to provide a stable braking force, such that the holder is stably thrust to provide a stable brake effect and prevent wear from an unstable contact. The two aprons abutting against an outer peripheral of the housing also provide the stable effort. The ovular elastomer provides more braking power than the conventional disk brake. The holder with the brake shoe moves in a straight line to provide a surface contact between the brake shoe and the rim such that the hydraulic brake assembly is effective to brake.

In accordance with another aspect of the present invention, a sealing plate is replaced to a sealing ring. Two aprons of the holder are canceled. The holder has a skirt extending from one end thereof and a dove-tail groove defined in another end thereof. A pushing mechanism is received in a housing. The pushing mechanism has an insert received in a chamber defined in the housing and an elastomer connected to the insert. The elastomer is covered on the insert and received in the housing. The housing has at least one screw hole defined therein and positioned adjacent to the chamber. A sealing ring is sleeved on the skirt of the holder and positioned between the holder and the elastomer to provide a sealing effort. The sealing ring is corresponded to the at least one screw hole and screwed on the housing.

Further benefits and advantages of the present invention will become apparent after a careful reading of the detailed description with appropriate reference to the accompanying drawings.

DETAILED DESCRIPTION OF THE INVENTION

Figure 1:
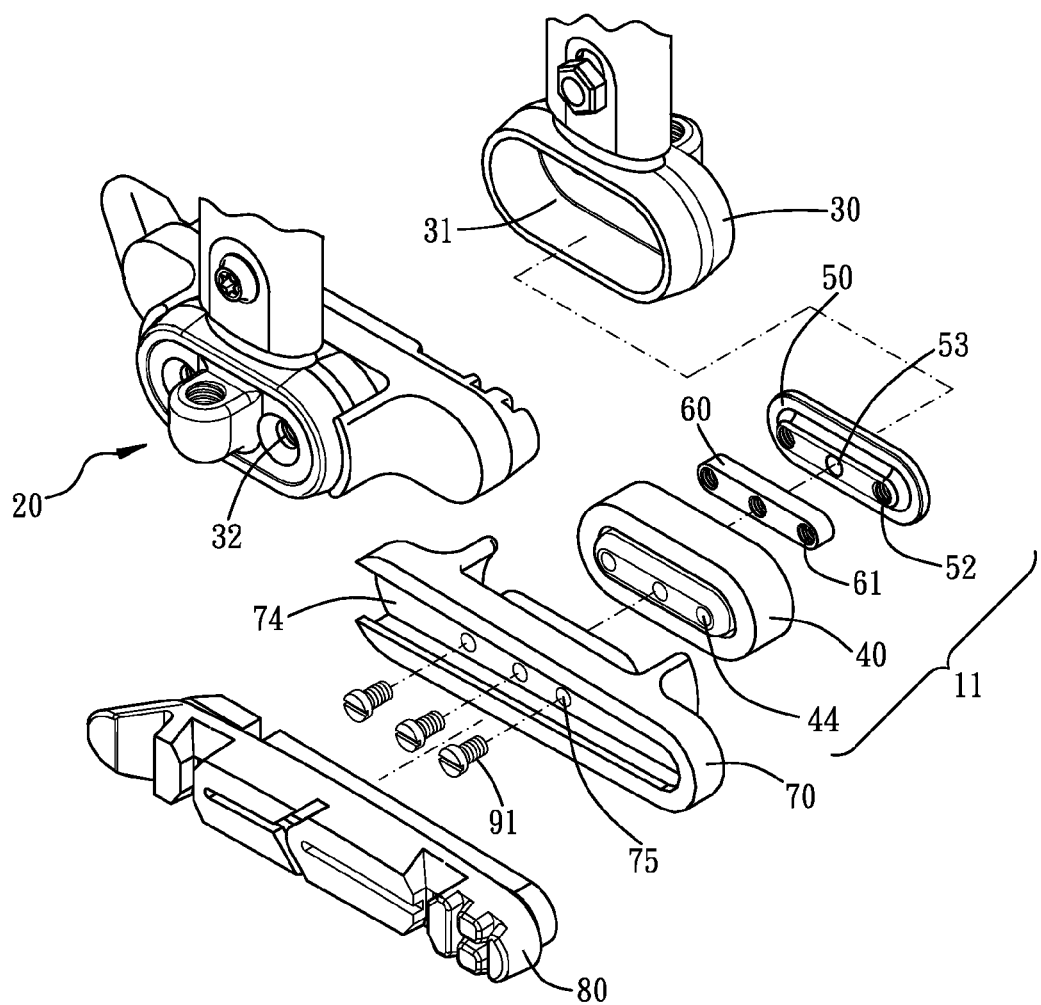
FIG. 1 is a partial exposed perspective view of a holder for hydraulic brake assembly in accordance with the present invention.
Figure 1A:
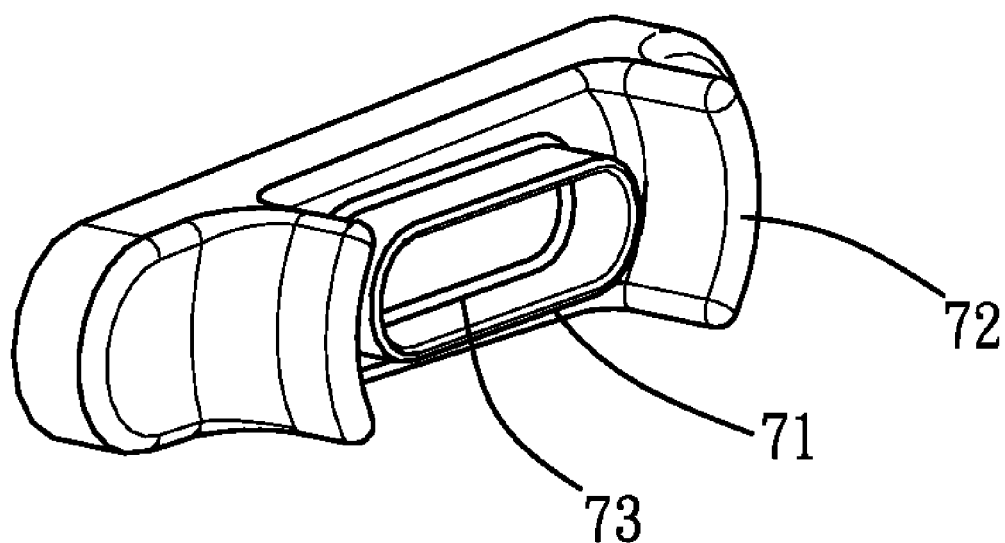
FIG. 1A is a perspective view of the holder in another direction.
Figure 2:
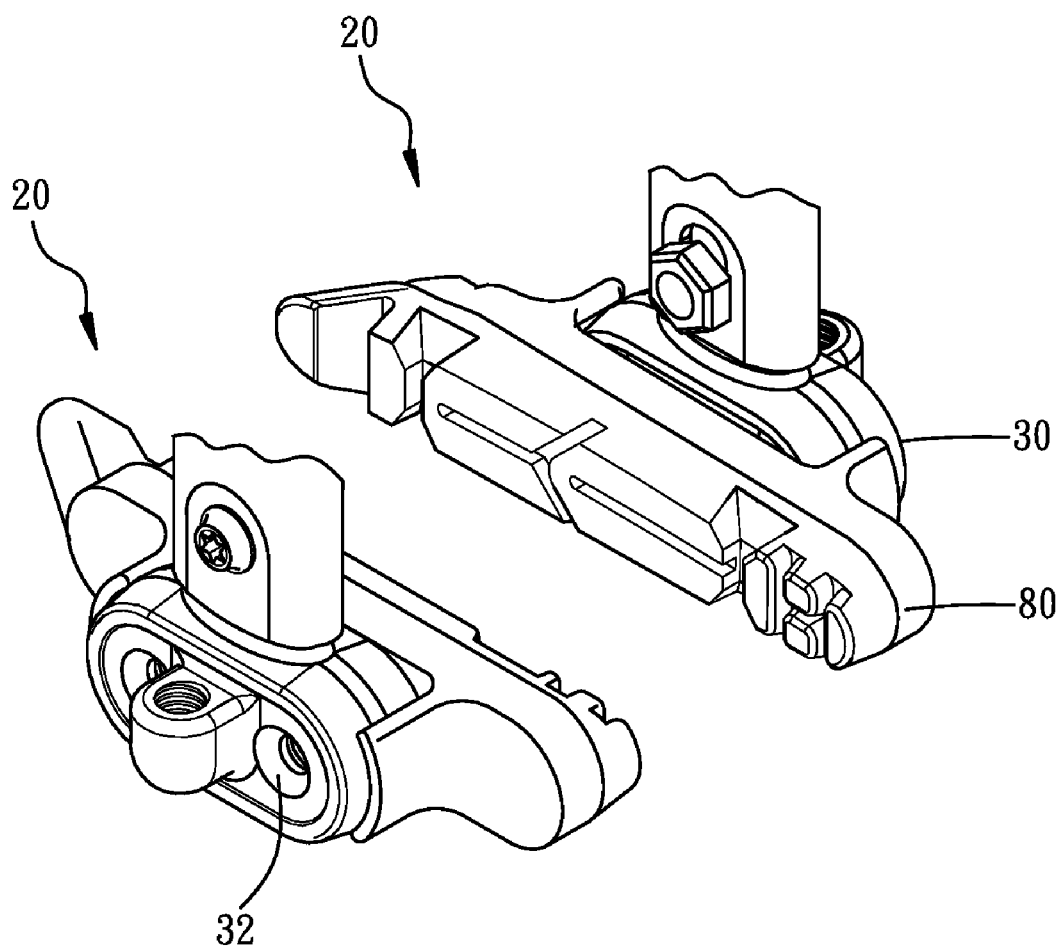
FIG. 2 is an assembled perspective view of the holder for hydraulic brake assembly in accordance with the present invention.

Referring to the drawings and initially to FIGS. 1-4, a holder for hydraulic brake assembly in accordance with the present invention comprises the holder 70 having one end connected to a pushing mechanism 11 and another end connected to a brake shoe 80. The pushing mechanism 11 is mounted on a housing 30. The holder 70, the pushing mechanism 11, and the brake shoe 80 are combined to form a hydraulic brake assembly 20. In the prefect embodiment, two hydraulic brake assemblies 20 are provided for a rim brake. The two hydraulic brake assemblies 20 are symmetrical with respect to one another such that a balanced braking force is obtained. In the following, only one of the two hydraulic brake assemblies 20 is described.

The housing 30 has an ovular and open chamber 31 defined therein for receiving the brake oil. The pushing mechanism 11 has an elastomer 40 having an ovular shape corresponding to the chamber 31 and is sealingly received in the chamber 31. The elastomer 40 has a flange 41 extended therefrom. The pushing mechanism 11 further includes a sealing plate 50 received in the chamber 31. The sealing plate 50 has a shoulder 51 extended therefrom. The housing 30 has two through holes 32 defined therein. The sealing plate 50 has two screw holes 52 defined therein and corresponding to the two through holes 32. When assembling, two screws (not numbered) pass through the two through holes 32 and fasten with the two screw holes 52 such that the shoulder 51 abuts against the flange 41 to provide a sealing effort. The sealing plate 50 has a bore 53 defined therein for passing the brake oil from oil tube (not shown).

The elastomer 40 has a U-shaped portion 42 formed therein for providing a resilient force. The elastomer 40 has a movable portion 43 disposed in a center thereof and connected to the U-shaped portion 42. When the oil pressure is high, the U-shaped portion 42 deforms such that the movable portion 43 is pushed outwardly. When the oil pressure is low, the U-shaped portion 42 restores such that the movable portion 43 moves back. The elastomer 40 has at least one bore 44 defined in the movable portion 43. The hydraulic brake assembly 20 further includes an insert 60 received in the chamber 31. The insert 60 is corresponding to the movable portion 43. The insert 60 has at least one threaded hole 61 defined therein and corresponding to the at least one bore 44.

The holder 70 is connected the elastomer 40, the brake shoe 80 connected to the holder 70, and at least one screw 91 connected to the holder 70. The holder 70 has a skirt 71 enclosedly formed thereon and outwardly extending therefrom. The holder 70 has two aprons 72 extended therefrom. The two aprons 72 are respectively positioned two sides of the skirt 71. The holder 70 has a receiving space 73 defined in the skirt 71 for receiving the movable portion 43 of the elastomer 40. The holder 70 has a dovetail groove 74 defined therein for detachably receiving the brake shoe 80. The holder 70 has at least one through hole 75 defined in a bottom of the dovetail groove 74 and corresponding to the at least one bore 44 in the elastomer 40. When assembling, the at least one screw 91 passes the at least one through hole 75 in the holder 70 and the at least one bore 44 in the elastomer 40 and fastens with the at least one threaded hole 61 in the insert 60. The brake shoe 80 is a conventional brake shoe 80 and is replaceable.

Figure 3:
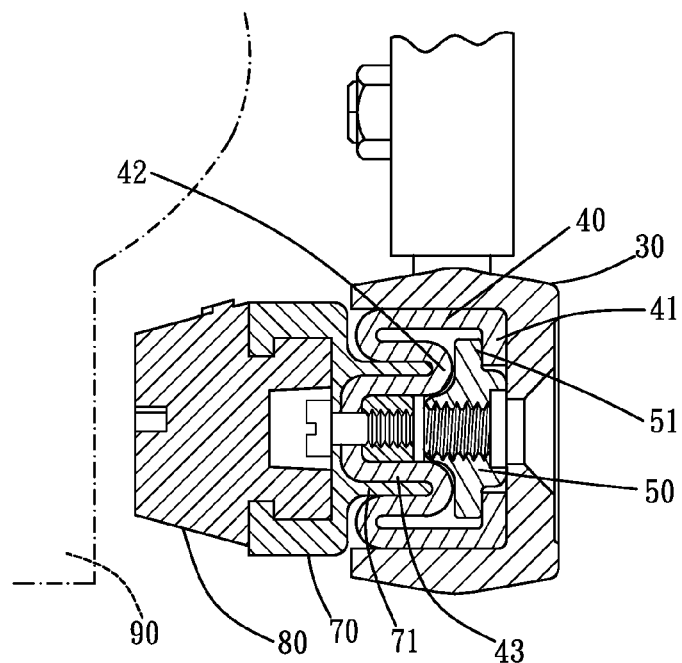
FIG. 3 is a partial cross-sectional front plane view of the hydraulic brake device in accordance with the present invention.
Figure 4:
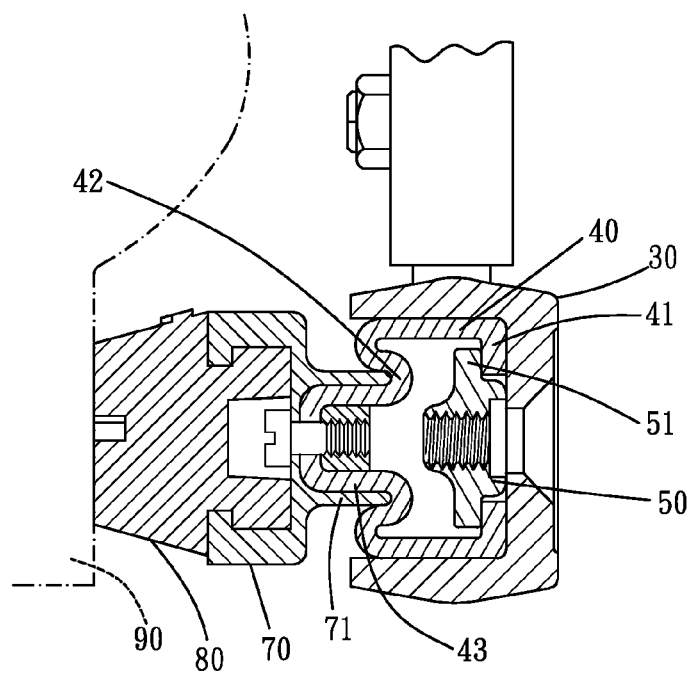
FIG. 4 is a partial cross-sectional front plane view of the hydraulic brake device in accordance with the present invention, showing that the brake shoe forces against the rim.

Referring to FIGS. 3 and 4, the operation of the hydraulic brake assembly 20 is illustrated. FIG. 3 shows the hydraulic brake assembly 20 is in an initial condition. The movable portion 43 of elastomer 40 is received in the receiving space 73 in the holder 70. The skirt 71 of the holder 70 abuts against the U-shaped portion 42 of the elastomer 40. When braking, the oil pressure in the chamber 31 is raised. The U-shaped portion 42 deforms gradually and the movable portion 43 is pushed outwardly such that the holder 70 and the brake shoe 80 are pushed toward a rim 90 until the brake shoe 80 forces against the rim 90 to brake. When the oil pressure is diminished, the movable portion 43 is pulled back by the resilient force of the U-shaped portion 42. The skirt 71 abuts against the U-shaped portion 42 and the movable portion 43 stably abuts against a bottom of the receiving space to provide a stable braking force, such that the holder 70 is stably thrust to provide a stable brake effect and prevent wear from an unstable contact. The two aprons 72 abutting against an outer peripheral of the housing 30 also provide the stable effort. The ovular elastomer 40 provides more braking power than the conventional disk brake. The holder 70 with the brake shoe 80 moves in a straight line to provide a surface contact between the brake shoe 80 and the rim 90 such that the hydraulic brake assembly 20 is effective to brake.

Figure 5:
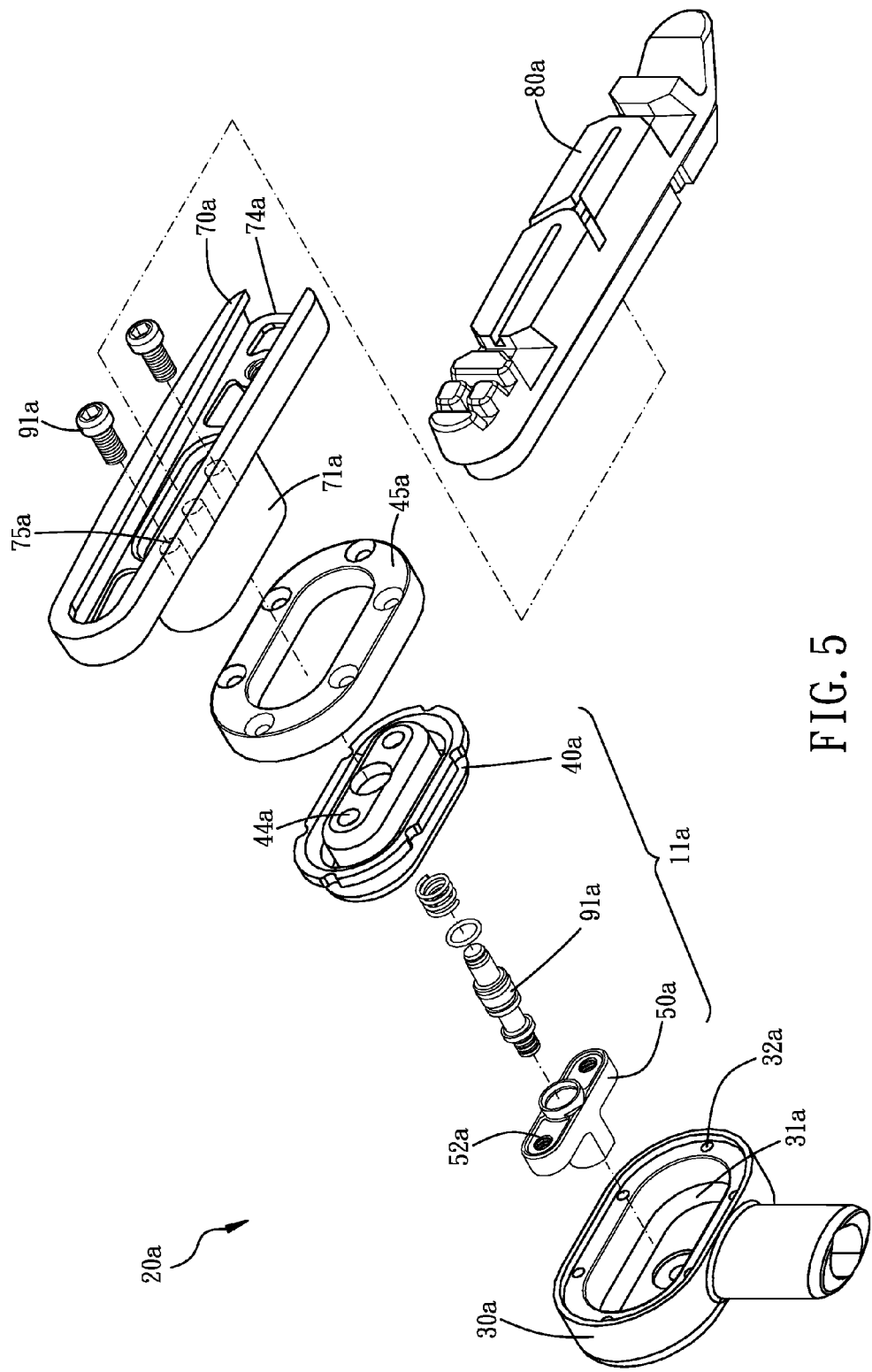
FIG. 5 shows an exposed perspective view of a holder for hydraulic brake assembly of a second embodiment in accordance with the present invention.
Figure 6:
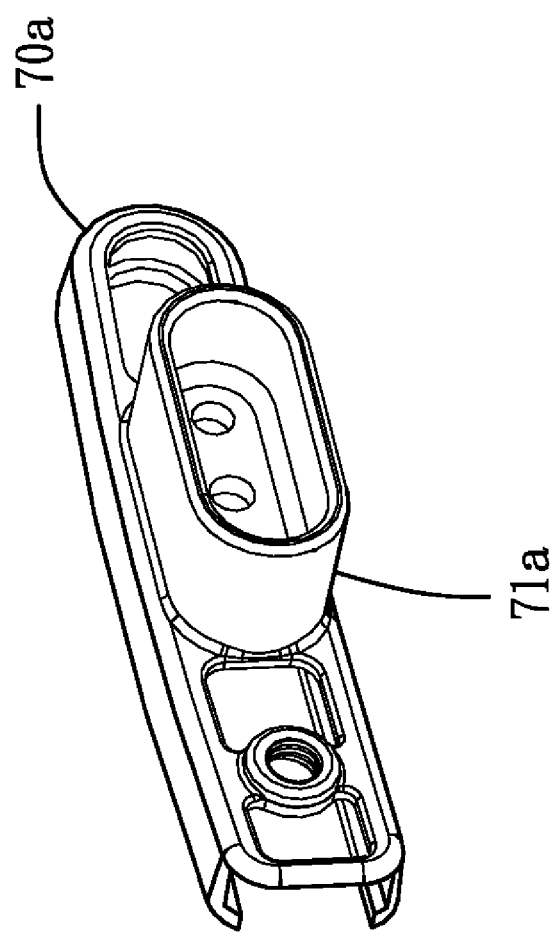
FIG. 6 is a perspective view of the holder of the second embodiment in another direction.
Figure 7:
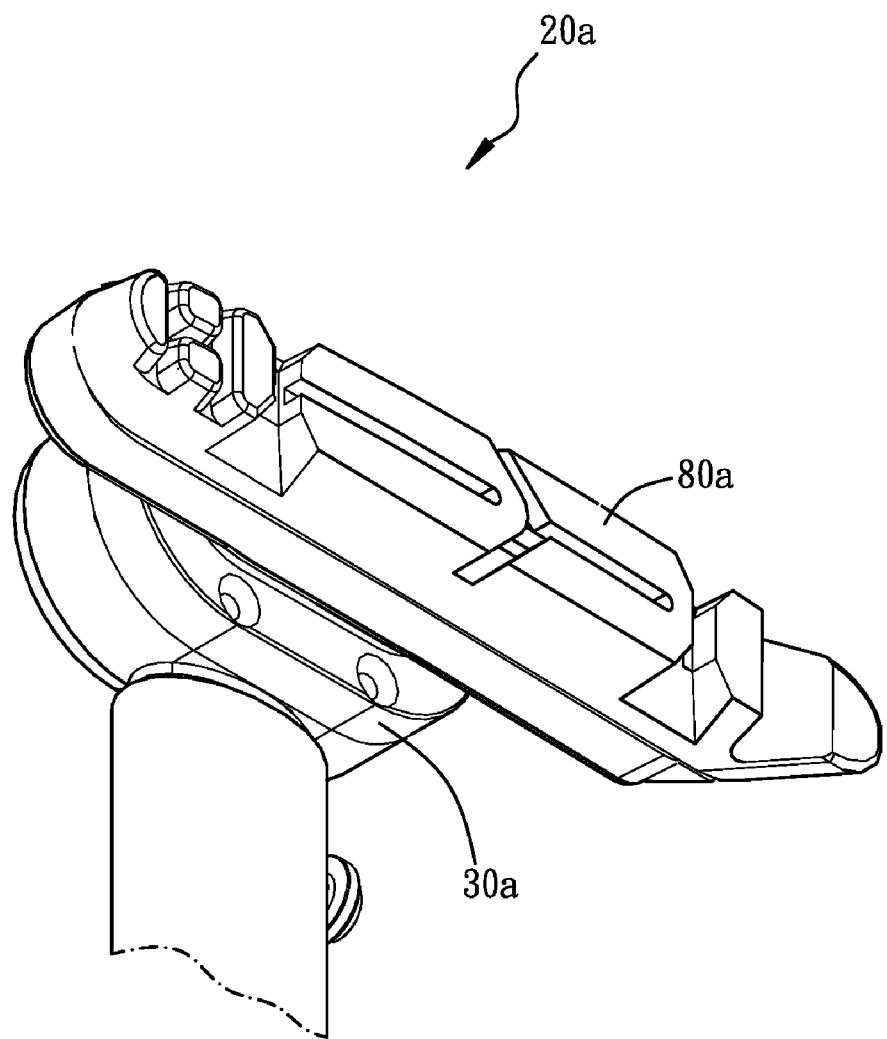
FIG. 7 is an assembled perspective view of the holder for hydraulic brake assembly of the second embodiment in accordance with the present invention.

With reference to FIG. 5-7, that shows a second embodiment of the holder for hydraulic brake assembly in accordance with the present invention. The elements and effects of the second embodiment which are the same with the first embodiment are not described, only the differences are described. The holder 70a has a skirt 71a extending from one end thereof and a dove-tail groove 74a defined in another end thereof. A pushing mechanism 11a is received in a housing 30a. The pushing mechanism 11a has an insert 50a received in a chamber 31a defined in the housing 30a and an elastomer 40a connected to the insert 50a. The elastomer 40a is covered on the insert 50a and received in the housing 31a. The housing has at least one screw hole 32a defined therein and positioned adjacent to the chamber 31a. A sealing ring 45a is sleeved on the skirt 71a of the holder 70a and positioned between the holder 70a and the elastomer 40a to provide a sealing effort. The sealing ring 45a is corresponded to the at least one screw hole 32a and screwed on the housing 30a. When assembling, at least one screw 91a passes through at least one through hole 75a defined in the holder 70a and at least one bore 44a defined in the elastomer 40a and screwed into at least one screw hole 52a defined in the insert 50a. A brake shoe 80a is correspondingly received in the dove-tail groove 74a in the holder 70a.

Although the invention has been explained in relation to its preferred embodiment, it is to be understood that many other possible modifications and variations can be made without departing from the spirit and scope of the invention as hereinafter claimed.

What is claimed is:

1. A holder for a hydraulic brake assembly comprising:
   one end thrust by a pushing mechanism and another end connected to a brake shoe, the holder having a skirt enclosedly formed on one end thereof and outwardly extending therefrom to define a receiving space in between the skirt, the pushing mechanism selectively received in the receiving space in the skirt; wherein the skirt is provided for stably connecting to the pushing mechanism such that the pushing mechanism is steady thrust with the holder to provide a stable brake effect and prevent wear from an unstable contact; and
   the pushing mechanism comprises a housing and an elastomer mounted in the housing, the housing having a chamber defined therein for receiving brake oil, the elastomer sealingly received in the chamber, the elastomer having a U-shaped portion formed therein and a movable portion disposed in a center thereof and connected to the U-shaped portion, the movable portion received in the receiving space in the skirt, the skirt embedded in between the U-shaped portion and the movable portion; wherein when oil pressure is raised, the U-shaped portion deforms and the movable portion is pushed outwardly such that the holder is pushed outwardly.

2. The holder for hydraulic brake assembly as claimed in claim 1, wherein the holder has two aprons extended therefrom, the two aprons respectively positioned on two sides of the skirt for providing a stable connecting effect.

3. The holder for hydraulic brake assembly as claimed in claim 1 further comprising a sealing plate received in the chamber, the sealing plate having a shoulder extended therefrom, the elastomer having a flange extended therefrom, wherein the shoulder abuts against the flange to provide a sealing effort.

4. The holder for hydraulic brake assembly as claimed in claim 3, wherein the housing has two through holes defined therein, the sealing plate having two screw holes defined therein and corresponding to the two through holes, wherein two screws pass through the two through holes and fasten with the two screw holes.

5. The holder for hydraulic brake assembly as claimed in claim 1, wherein the chamber has an ovular shape, the elastomer having an ovular shape corresponding to the chamber.

6. The holder for hydraulic brake assembly as claimed in claim 1, wherein the holder has a dovetail groove defined therein for detachably receiving the brake shoe.

7. The holder for hydraulic brake assembly as claimed in claim 1 further comprising an insert received in the chamber and corresponding to the movable portion, the elastomer having at least one bore defined therein, the insert having at least one threaded hole defined therein and corresponding to the at least one bore, the holder having at least one through hole defined therein and corresponding to the at least one bore, wherein at least one screw passes through the at least one through hole and the at least one bore and fastens with the at least one threaded hole.

8. The holder for hydraulic brake assembly as claimed in claim 1 further comprising a sealing ring sleeved on the skirt of the holder and positioned between the holder and the pushing mechanism to provide a sealing effort.

\* \* \* \* \*